(12) United States Patent
Keller

(10) Patent No.: US 9,751,738 B2
(45) Date of Patent: Sep. 5, 2017

(54) STEERING SYSTEM FOR AN INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 41 days.

(21) Appl. No.: 14/442,400

(22) PCT Filed: Oct. 30, 2013

(86) PCT No.: PCT/EP2013/072694
§ 371 (c)(1),
(2) Date: May 13, 2015

(87) PCT Pub. No.: WO2014/075921
PCT Pub. Date: May 22, 2014

(65) Prior Publication Data
US 2016/0272474 A1    Sep. 22, 2016

(30) Foreign Application Priority Data

Nov. 15, 2012   (DE) .......................... 10 2012 110 988

(51) Int. Cl.
| | |
|---|---|
| *B62D 5/12* | (2006.01) |
| *B62D 7/08* | (2006.01) |
| *B66F 9/075* | (2006.01) |
| *B66F 9/22* | (2006.01) |

(52) U.S. Cl.
CPC ............ *B66F 9/07568* (2013.01); *B62D 5/12* (2013.01); *B62D 7/08* (2013.01); *B66F 9/22* (2013.01)

(58) Field of Classification Search
CPC .................................................... B60F 9/07568
(Continued)

(56) References Cited

U.S. PATENT DOCUMENTS 3,620,321 A  * 11/1971  Thibodeau ............... B62D 7/14
                                                180/16
5,653,304 A  *  8/1997  Renfroe .................... B62D 3/14
                                                180/402
(Continued)

FOREIGN PATENT DOCUMENTS

| | | |
|---|---|---|
| DE | 40 25 543 A1 | 2/1992 |
| DE | 103 19 448 A1 | 11/2004 |

(Continued)

OTHER PUBLICATIONS

B. Casey et al.: "How to Synchronize Hydraulic Cylinders", www.hydraulicsupermarket.com, pp. 1-8 (2006).

*Primary Examiner* — Tony Winner
(74) *Attorney, Agent, or Firm* — Norman B. Thot

(57) ABSTRACT

A steering system for an industrial truck includes a first wheel set configured to be hydraulically steerable, a second wheel set configured to be hydraulically steerable, a first hydraulic linear motor connected to the first wheel set, and a second hydraulic linear motor connected to the second wheel set. The first hydraulic linear motor is provided as a first synchronizing cylinder. The second hydraulic linear motor is provided as a second synchronizing cylinder. The first synchronizing cylinder and the second synchronizing cylinder are operatively connected to each other.

12 Claims, 6 Drawing Sheets

(58) Field of Classification Search
USPC .......................................... 180/438, 411, 408
See application file for complete search history.

(56) References Cited

U.S. PATENT DOCUMENTS

| | | | |
|---|---|---|---|
| 5,904,365 A * | 5/1999 | Dillon | B62D 59/02 |
| | | | 180/14.1 |
| 6,070,691 A | 6/2000 | Evans | |
| 6,488,114 B1 * | 12/2002 | McMahon | B60G 5/02 |
| | | | 180/411 |
| 6,557,658 B1 | 5/2003 | Enmeiji et al. | |
| 2004/0020724 A1 * | 2/2004 | Yurushi | B66F 9/07568 |
| | | | 187/224 |
| 2005/0133294 A1 | 6/2005 | Jung | |
| 2006/0213698 A1 | 9/2006 | Gaetani | |
| 2007/0289798 A1 | 12/2007 | Kaufmann | |
| 2010/0051375 A1 * | 3/2010 | Sherwin | B62D 5/001 |
| | | | 180/411 |
| 2013/0030656 A1 | 1/2013 | Keller | |

FOREIGN PATENT DOCUMENTS

| | | |
|---|---|---|
| DE | 10 2010 016 470 B4 | 10/2011 |
| EP | 1 547 905 A2 | 6/2005 |
| EP | 1 651 501 B1 | 5/2006 |
| GB | 899 439 A | 6/1962 |
| JP | 2001-63984 A | 3/2001 |
| JP | 2004-231111 A | 8/2004 |
| JP | 2006-160151 A | 6/2006 |
| WO | WO 01/12493 A1 | 2/2001 |

* cited by examiner

STEERING SYSTEM FOR AN INDUSTRIAL TRUCK

CROSS REFERENCE TO PRIOR APPLICATIONS

This application is a U.S. National Phase application under 35 U.S.C. §371 of International Application No. PCT/EP2013/072694, filed on Oct. 30, 2013 and which claims benefit to German Patent Application No. 10 2012 110 988.5, filed on Nov. 15, 2012. The International Application was published in German on May 22, 2014 as WO 2014/075921 A1 under PCT Article 21(2).

FIELD

The present invention relates to a steering system for an industrial truck in which at least two hydraulically steerable wheel sets are provided.

BACKGROUND

Such a steering system has previously been described, for example, in DE 10 2010 016 470 B4. A disadvantage of this steering system, in which the steering is driven by means of chains, is that the installation and the maintenance of the chains are difficult. The chains must, for example, be (re-) tensioned etc. Moreover, if, for example, steering is performed while the vehicle is stationary, control difficulties can result from vibrations caused by rubber restoring forces of the wheel on the ground surface. The electronic coupling between the wheels is also complex.

SUMMARY

An aspect of the present invention is to provide a steering system which improves on at least one of the above disadvantages.

In an embodiment, the present invention provides a steering system for an industrial truck which includes a first wheel set configured to be hydraulically steerable, a second wheel set configured to be hydraulically steerable, a first hydraulic linear motor connected to the first wheel set, and a second hydraulic linear motor connected to the second wheel set. The first hydraulic linear motor is provided as a first synchronizing cylinder. The second hydraulic linear motor is provided as a second synchronizing cylinder. The first synchronizing cylinder and the second synchronizing cylinder are operatively connected to each other.

BRIEF DESCRIPTION OF THE DRAWINGS

The present invention is described in greater detail below on the basis of embodiments and of the drawings in which.

DETAILED DESCRIPTION

Figure 1:
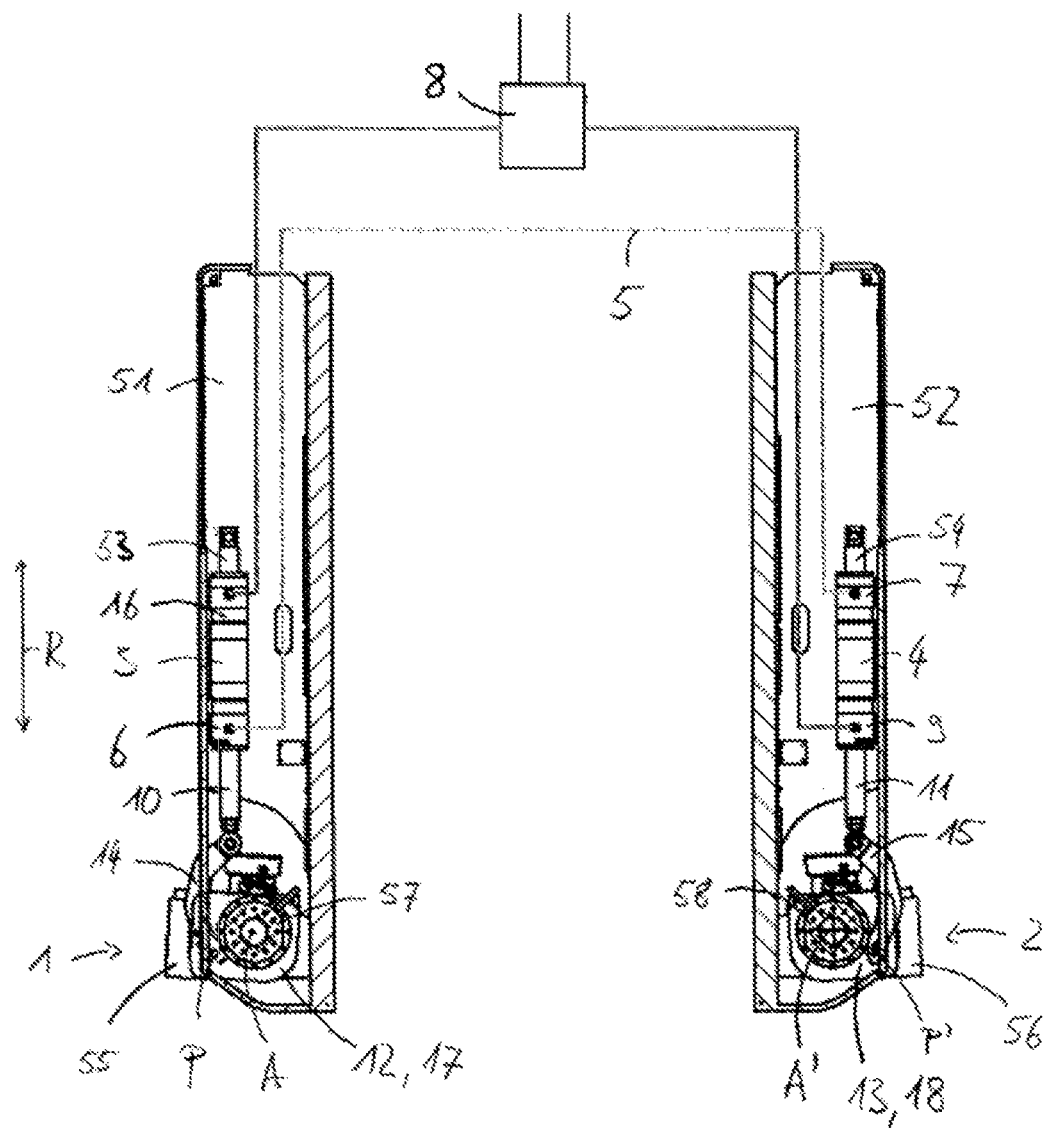
FIG. 1 shows a view from above of a part of an industrial truck according to a first embodiment.

At least two hydraulically steerable wheel sets are provided in the steering system according to the present invention for an industrial truck. Each wheel set can, for example, comprise at least one rotatably mounted wheel. The wheel sets are in each case steerable via a hydraulic linear motor which is designed as a synchronizing cylinder. (These linear motors may also be designated herein as steering motors.) The at least two synchronizing cylinders are operatively connected to one another.

An advantageous hydraulic coupling is thereby created between the at least two hydraulically steerable wheel sets. The use of synchronizing cylinders instead of differential cylinders also avoids difficulties of differential cylinders which arises because of the piston rod there acts on only one side of the piston so that different sizes of piston surfaces result.

Each of the at least two synchronizing cylinders can, for example, have precisely one active piston rod which serves to transmit the translational movement of the piston. The additional piston rod of the synchronizing cylinder which is provided to achieve the synchronization can, for example, not be connected at its free end, and therefore does not serve to transmit a translational movement.

The at least two synchronizing cylinders can advantageously be disposed in a common hydraulic circuit which can, for example, be closed.

The piston of each hydraulic cylinder divides the interior of the cylinder into a chamber facing the active piston rod and a chamber facing away from the active piston rod. When hydraulic fluid flows into the chamber facing the active piston rod, the active piston rod moves in. This chamber is therefore designated below as a traction chamber. When hydraulic fluid flows into the chamber facing away from the active piston rod, the active piston rod moves out, and this chamber is therefore designated below as a pressure chamber.

The hydraulic circuit can, for example, be configured so that the traction chamber of a synchronizing cylinder is connected to the pressure chamber of another synchronizing cylinder. The pressure chamber of the synchronizing cylinder of which the traction chamber is connected to the pressure chamber of another synchronizing cylinder can, for example, be connected to a hydraulic valve. The traction chamber of the cylinder of which the pressure chamber is connected to the traction chamber of another cylinder can, for example, likewise connected to a hydraulic valve, for example, to the same hydraulic valve. The active piston rods of the at least two synchronizing cylinders carry out similar movements as a result. If, for example, the active piston rod of a synchronizing cylinder moves out, the active piston rod of the at least one further synchronizing cylinder also moves out.

In an embodiment with precisely two synchronizing cylinders, the traction chamber of one synchronizing cylinder can, for example, be connected to the pressure chamber of the other synchronizing cylinder, and the two other chambers of the cylinder can, for example, be connected to the hydraulic valve.

The two synchronizing cylinders can, for example, be disposed parallel to one another and the active piston rods of the two synchronizing cylinders can be oriented in the same direction. The two active piston rods then always carry out parallel, synchronous movements.

For the purpose of steerability of the at least one wheel, each wheel set can, for example, also comprise a rotatably mounted device in which this wheel is rotatably mounted. This device may, for example, be forked. This device can, for example, comprise a wheel bogie or is formed by a wheel bogie.

For transformation of the translational movement of the hydraulic linear motor into a rotational movement of the rotatably mounted device, the active piston rod of the synchronizing cylinder can, for example, act on a point on the rotatably mounted device which is offset with respect to the axis of rotation of the rotatably mounted device (steering axle). The necessary lever is thereby provided to create a torque. In an embodiment, the active piston rod of one synchronizing cylinder can, for example, act on a point on the associated rotatably mounted device of the associated wheel set which is offset from another side of the axis of rotation of the rotatably mounted device, with respect to the corresponding point of the active piston rod of the at least one other synchronizing cylinder with respect to the axis of rotation of the there rotatably mounted device. In spite of parallel, synchronous movement of the active piston rods of the two synchronizing cylinders, a rotation in the opposite direction, and thus steering of the two wheel sets, thereby always takes place.

The active piston rod of the synchronizing cylinder can advantageously act in each case via a steering lever on the associated rotatably mounted device of the wheel set. The steering lever can advantageously in each case be rotatably mounted on the associated active piston rod and rotatably disposed on the associated rotatably mounted device. The steering lever can, for example, be rotatably mounted with one end on the active piston rod and with the other end on the rotatably mounted device.

Several advantages are achieved by the steering lever. On the one hand, a prerequisite is created so that the synchronizing cylinder itself, or more precisely, the housing thereof, can be disposed stationary with respect to the chassis of the industrial truck. The cylinder does not have to move with the steering movement. This may have the advantage inter alia that the hydraulic lines supplying the synchronizing cylinders may, for example, be of a rigid design. In the case of the steering lever, there also exist greater freedoms with respect to the shaping than in the case of the active piston rod, so that the shape of the lever can, for example, be optimized with regard to the achievable steering angle.

If the steering lever is curved, a greater steering angle can be achieved than in the case of a straight steering lever.

The rotatably mounted devices can, for example, each have an opening into which the steering levers enter, for example, only in specific steering situations.

The two wheel sets are hydraulically coupled to one another by the operative connection of the two synchronizing cylinders. No electronic coupling can, for example, therefore be provided between the rotatably mounted devices of the hydraulically coupled wheel sets.

The steering system can, for example, have a steering element, in particular, a steering wheel. A steering orbitrol can, for example, be provided to which the steering element can, for example, be mechanically connected.

In an embodiment of the present invention, at least one first steering motor can, for example, be provided. Two first steering motors can, for example, be provided, and these can, for example, be formed by the hydraulic synchronizing cylinders coupled in the manner described above. The steering motors can, for example, serve to actuate two steerable first wheel sets for which the steering commands are manually predetermined.

The at least one steering motor or the two first steering motors are or can, for example, be hydraulically connected to the steering element. They can, for example, also be driven selectively as a function of a steering angle desired value generated by the steering control apparatus.

A first steering angle pickup can advantageously be provided. This pickup can, for example, detect the steering angle of the at least one manually steerable first wheel set. In the embodiment with two first manually steerable wheel sets, the steering angle pickup can, for example, detect the steering angle of precisely one of these two first wheel sets. The steering angle pickup can, for example, be operatively connected to a steering control for programmed switch-over.

In the embodiment, at least one further steerable wheel set, steered by motor power, is provided.

The steering motor of this second wheel set is or can, for example, be connected to the steering element. It can, for example, also be driven selectively as a function of a steering angle desired value generated by the steering control apparatus.

A second steering angle pickup can advantageously be provided to detect the steering angle of this second wheel set. The second steering angle pickup can, for example, also be operatively connected to a steering control.

A switch-over valve can, for example, be provided, by which it is possible to change over between the hydraulic connection of the steering orbitrol to the at least one first hydraulic steering motor and the hydraulic connection of the steering orbitrol to the second hydraulic steering motor.

The steering motors which, depending upon the position of the switch-over valve, are not hydraulically connected to the steering orbitrol can, for example, be brought, as a function of a steering angle desired value generated by the steering control apparatus, into a specific position and remain there.

The at least one second wheel set driven by motor power is thus, for example, operatively connected to a second hydraulic steering motor. This motor may be a rotary motor or likewise a synchronizing cylinder. This synchronizing cylinder can have the same shape and size as the synchronizing cylinders of the first wheel sets.

The steering control apparatus can, for example, be a steering computer having an apparatus for storing a plurality of steering programs.

The steering angle pickups may be electrical or electronic steering angle sensors.

The present invention also extends to an industrial truck having a previously described steering system.

The present invention will now be explained using the example of two exemplary embodiments.

FIG. 1 shows a detail of an industrial truck 100 according to a first embodiment with a first embodiment of a steering system according to the present invention. Two segments 51, 52 of the chassis can be seen which extend parallel and spaced apart from one another. These can be connected at their upper ends by a cross-member which is not shown in the drawings. A wheel set 1, 2 is disposed in each case on the lower ends of the segments 51, 52 in FIG. 1.

In the shown embodiment, one wheel set 1, 2 in each case comprises precisely one wheel. It is conceivable that a wheel set 1, 2 comprises a plurality of wheels, and that, for example, twin wheels are provided. The industrial truck 100 has at least one further wheel set which is not shown in FIG. 1. The industrial truck 100 may, for example, be a threewheeled or four-wheeled vehicle. Two hydraulic linear motors are shown which are disposed parallel to one another and are designed as synchronizing cylinders 3, 4. The synchronizing cylinders 3, 4 are disposed in the segments 51, 52 in the direction R of the longitudinal extent of said segments. They thus do not extend obliquely in the segments 51, 52. Each synchronizing cylinder 3, 4 has an active piston rod 10, 11. In order to achieve the synchronization, each synchronizing cylinder 3, 4 also has a passive piston rod 53, 54, of which the end is free and which does not serve to transmit a translational movement. In order to achieve the steerability of the wheel 55, 56, each wheel set 1, 2 has a rotatably mounted device 12, 13. This rotatably mounted device 12, 13 is designed as a wheel bogie 17, 18 and is mounted so as to be rotatable by means of a steering bearing 57, 58 about a steering axis A, A'. The steering axis A, A' can, for example, be vertical. For transformation of the translational motion provided by the synchronizing cylinders 3, 4 into the rotational steering movement, the active piston rod 10, 11 of the synchronizing cylinder 3, 4 acts in each case on a point P, P' on the wheel bogie 17, 18 which is offset with respect to the axis of rotation A, A'.

The active piston rod 10, 11 of each synchronizing cylinder 3, 4 is in this case not connected to the wheel bogie 17, 18 directly, but by means of a steering lever 14, 15, the connection of the synchronizing cylinders 3, 4 to the wheel bogie 17, 18, takes place by steering levers 14, 15. The steering lever 14, 15 is curved. As shown in particular in the left-hand and the central upper representation in FIG. 2, a greater steering angle is thereby achieved since the steering lever 14, 15 can diverge from the wheel bogie 17, 18 illustrated in FIG. 2 as a circle. The two steering levers 14, 15 are configured and disposed in mirror symmetry relative to one another. The respective active piston rod 10, 11 is connected so as to swivel on the respective steering lever 14, 15 on the respective wheel bogie 17, 18, in each case about an axis parallel to the axis of rotation A or A'.

The two synchronizing cylinders 3, 4 are operatively connected to one another; specifically, they are disposed in a common hydraulic circuit 5 which is closed in the shown embodiment.

FIG. 1 shows that the traction chamber 6 of the left synchronizing cylinder 3 is connected to the pressure chamber 7 of the synchronizing cylinder 4 shown on the right in FIG. 1 by a hydraulic line. It also shows that the pressure chamber 16 of the synchronizing cylinder 3 shown on the left is connected to a hydraulic valve 8. The traction chamber 9 of the synchronizing cylinder 4 also shown on the right is connected to hydraulic valve 8. The hydraulic valve 8 may also be designated as a steering unit or steering valve.

As a function of the position of a steering element, for example, the rotational position of a steering wheel (not shown in FIGS. 1 to 4), the hydraulic valve 8 can connect the hydraulic lines extending on the right and left thereof in FIG. 1 to the return connection or pressure connection of a hydraulic pump (not shown). For example, the hydraulic line extending on the left of the hydraulic valve 8 in FIG. 1 can be connected to the pressure connection of a hydraulic pump (not shown), and the hydraulic line extending on the right in FIG. 1 is connected to a return connection. In this case, hydraulic fluid flows into the pressure chamber 16 of the left-hand synchronizing cylinder. The active piston rod 10 therefore moves out. In this connection, the piston displaces hydraulic fluid from the traction chamber 6 of the left-hand synchronizing cylinder 3. This flows into the pressure chamber 7 of the right-hand synchronizing cylinder 4. The active piston rod 11 of the right-hand synchronizing cylinder 4 therefore also moves out. In another position of the hydraulic valve 8, both active piston rods 10, 11 move in correspondingly. Since the synchronizing cylinders 3, 4 are disposed parallel to one another, and the active piston rods 10, 11 are oriented in the same direction, parallel movements of the active piston rods 10, 11 are therefore always produced. Both synchronizing cylinders 3, 4 are disposed on the same side, at the top in FIG. 1, of the axis of rotation A, A'. Since the point of attack P of the synchronizing cylinder on the left in FIG. 1 is disposed offset to the left of the axis of rotation A and the point of attack P' of the synchronizing cylinder 4 on the right in FIG. 1 is disposed offset to the right of the associated axis of rotation A', the parallel, synchronous movements of the active piston rods 10, 11 effect rotary movements of the wheels 55, 56 in opposite directions. Since the two wheels 55, 56, or wheel sets 1, 2, are hydraulically coupled to one another, an electronic coupling is not necessary and is not present in the embodiment shown in FIG. 1.

Figure 3:
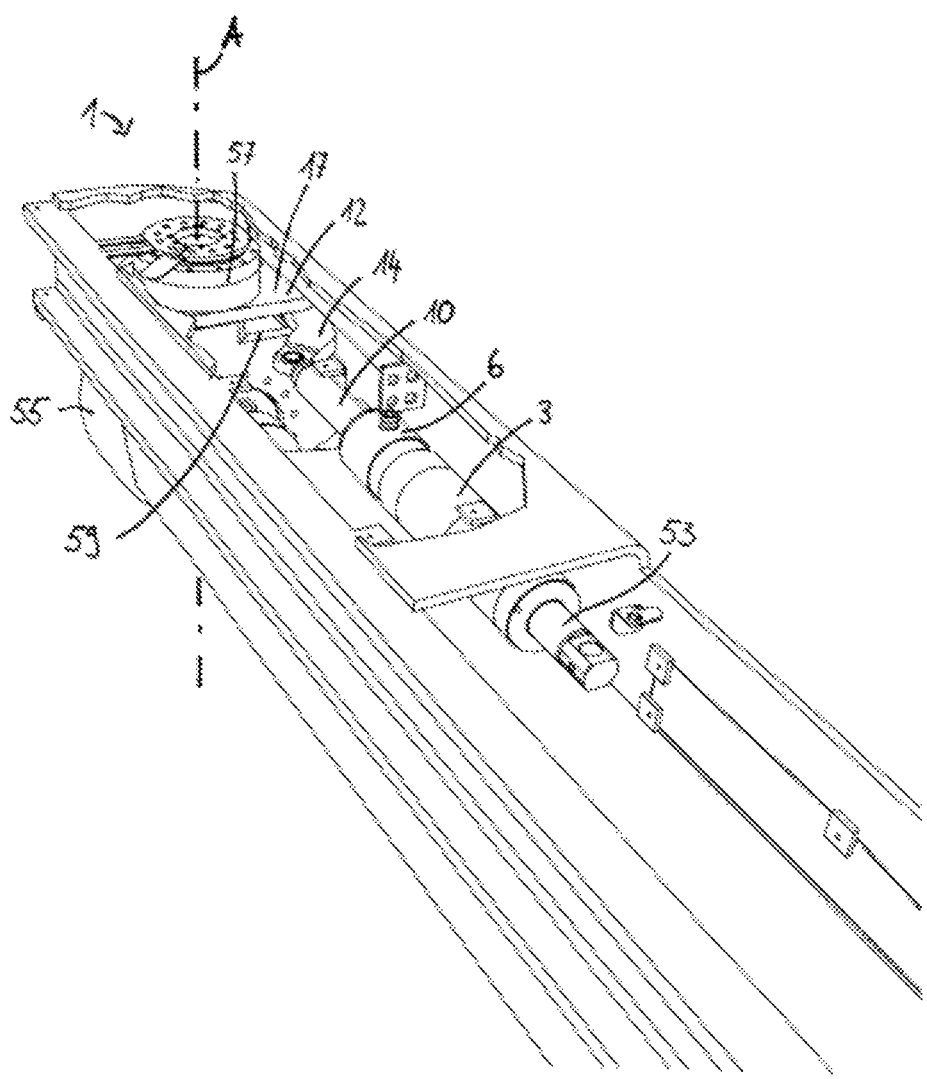
FIG. 3 shows a perspective representation of a part of the industrial truck according to the first embodiment.

As shown in particular in FIG. 3 for a wheel bogie 17, both wheel bogies 17, 18 have an opening 59. As FIG. 4 shows, in certain steering situations, the steering lever 14 enters this opening 59 and therefore facilitates these steering situations.

Figure 2:
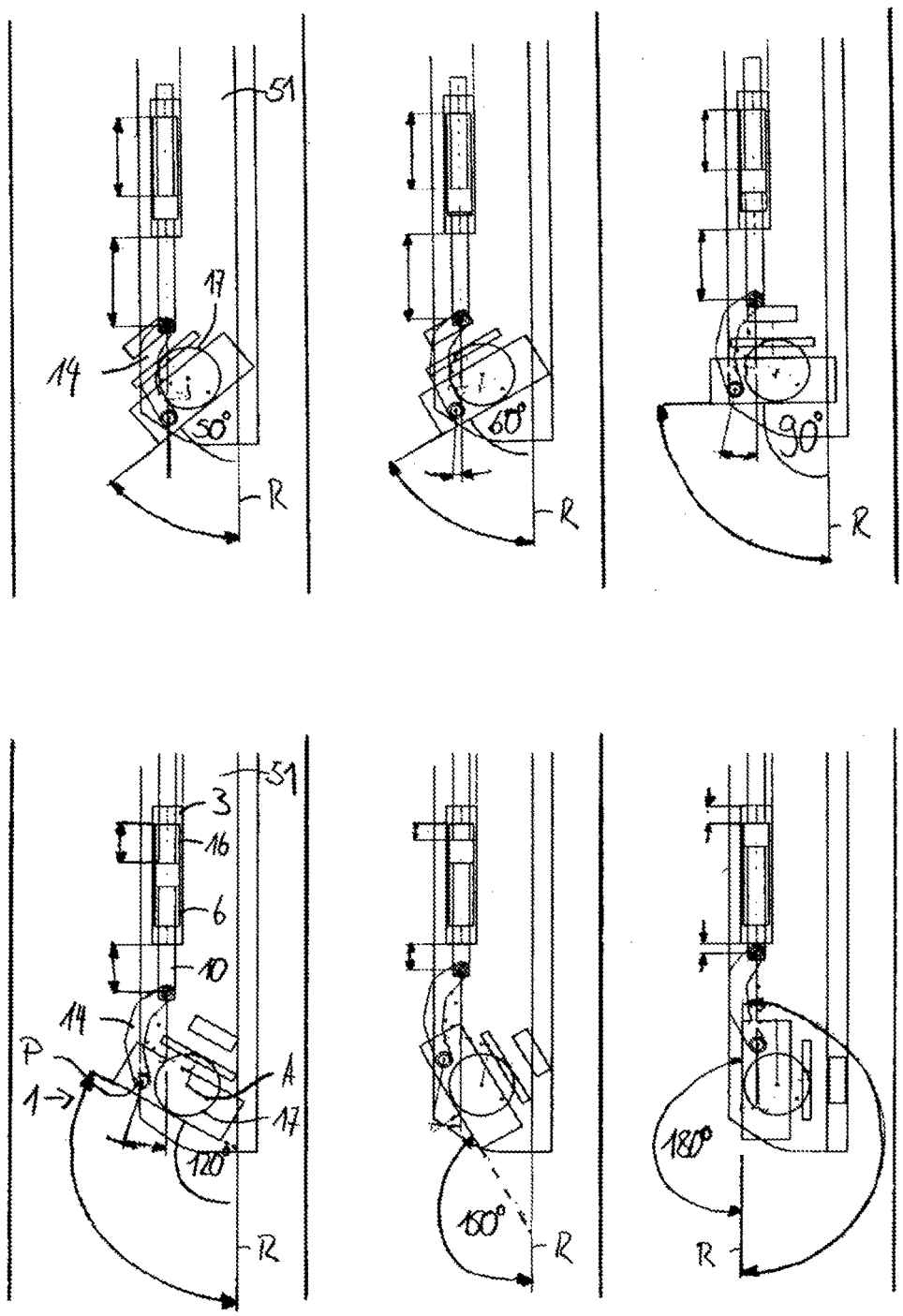
FIG. 2 shows a detail of the industrial truck of FIG. 1 in six different steering positions.

An increase in the possible steering angle is thus achieved by the openings. The interaction of the curvature of the steering lever 14, 15 and the opening 59 leads to a large steering angle without overly weakening the wheel bogies 17, 18 by openings which are too large. As FIG. 2 shows, the possible steering angle ranges from an approximately 50° position of a wheel relative to the direction R of the longitudinal extent of the segment (top left) to an approximately 180° degree position (bottom right). The wheel 55, 56 can thus be turned by approximately 130°.

Figure 4:
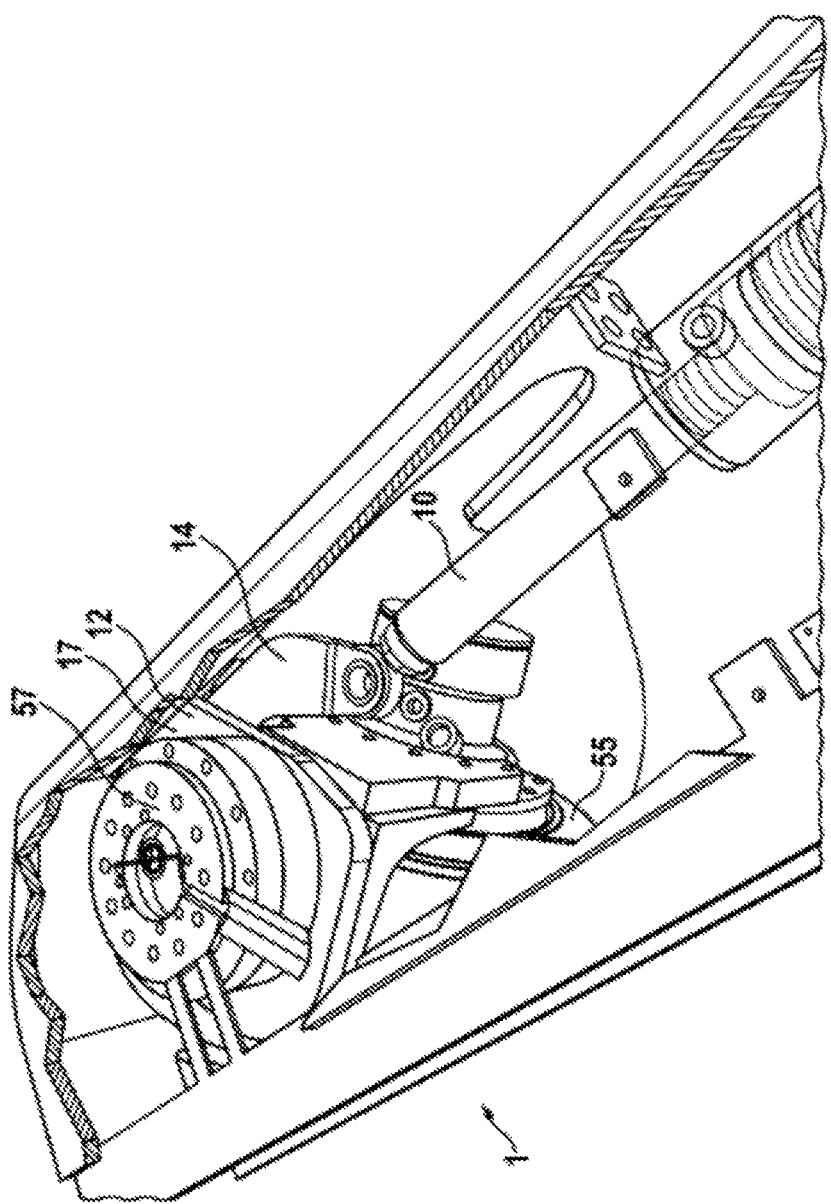
FIG. 4 shows a representation of a detail of FIG. 3.

FIGS. 3 and 4 also show that the steering lever 14, when viewed in the vertical direction, is disposed between the steering bearing 57 and the wheel 55. This leads to a very low height.

Figure 5:
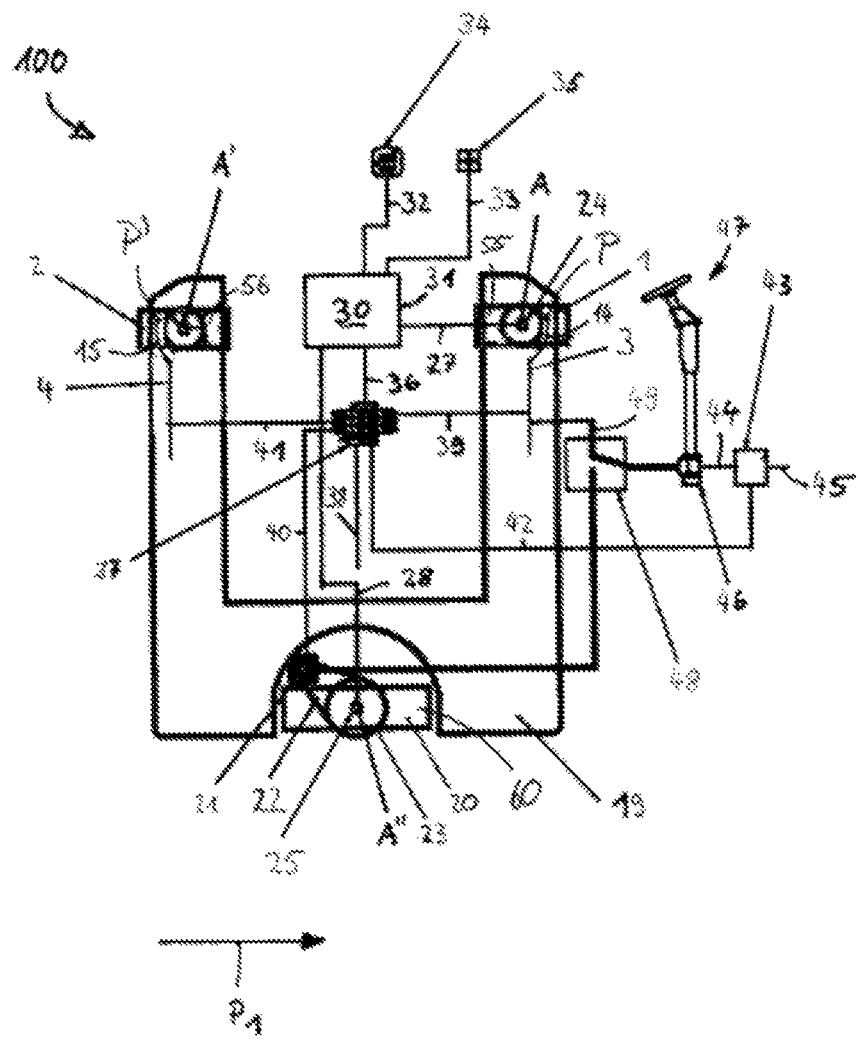
FIG. 5 schematically shows a block diagram of a steering system according to the present invention in a second embodiment using the example of an industrial truck having three wheel sets in longitudinal travel.
Figure 6:
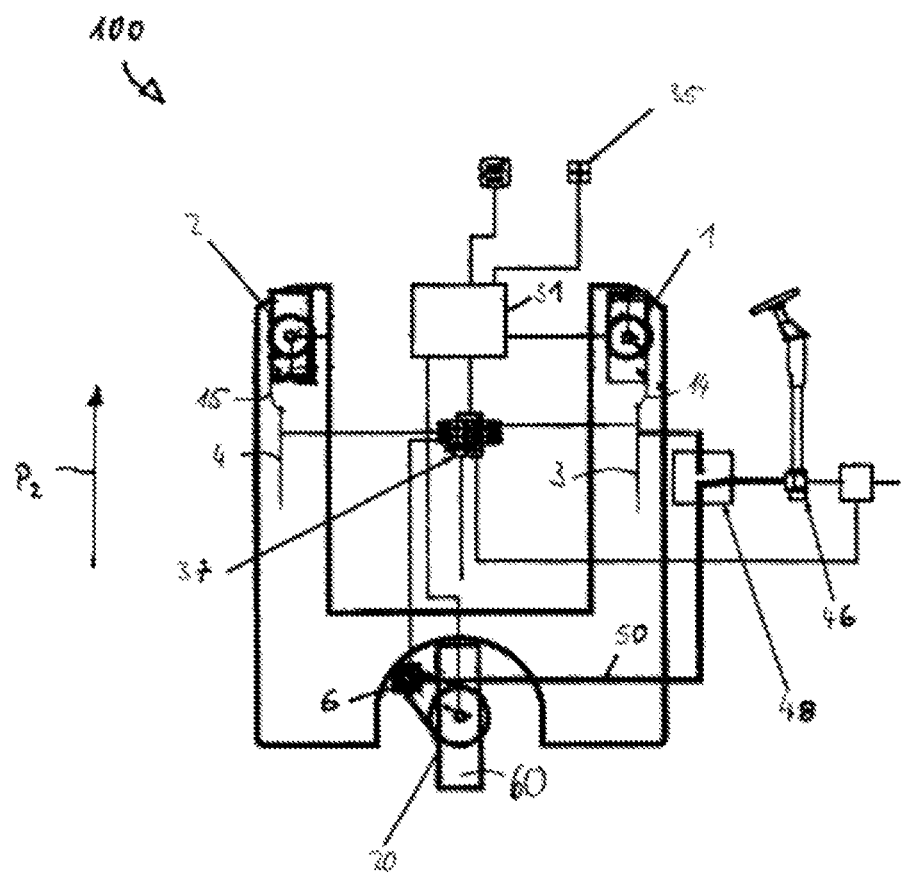
FIG. 6 shows the same block diagram of the steering system as in FIG. 5 using the example of the same industrial truck in transverse travel.

FIGS. 5 and 6 show a second embodiment. In contrast to FIG. 1, in FIGS. 5 and 6, hydraulic lines are only illustrated schematically. In FIGS. 5 and 6, a line may therefore, for example, represent two hydraulic lines of a circuit.

FIGS. 5 and 6 show schematically the chassis 19 of an industrial truck designated as a whole by 100. All the wheel sets 1, 2, 20 are disposed so as to be steerable about axes A, A', A'' extending perpendicular to the drawing plane.

Hydraulic steering motors 3, 4, 21 associated in each case with one of the wheel sets are provided to turn the wheel sets 1, 2, 20. The hydraulic steering motors 3, 4 are configured as hydraulic synchronizing cylinders and, in the shown embodiment, the hydraulic steering motor 21 is configured as a hydraulic rotary motor with a flexible traction element 22 for transmitting the movement to a steering actuation wheel 23. It is conceivable that the hydraulic steering motor 21 is also configured as a hydraulic cylinder, for example, a synchronizing cylinder, the shape and size of which correspond to the other hydraulic steering motors. The wheel sets 1, 2 shown at the top in FIGS. 5 and 6 are designated below as load wheel sets, and the lower wheel set 20 with the wheel 60 is designated as a further wheel set.

A steering angle pickup 24, 25 which operates electrically or electronically is provided on precisely one of the load wheel sets 1 and on the further wheel set 20. The steering angle pickup 24 is connected by means of a signal line 27, and the steering angle pickup 25 is connected by means of a signal line 28 to a steering control apparatus 30 which is designed as a steering computer 31 with an arrangement for storing a plurality of steering programs. The steering computer 31 is connected by further signal lines 32, 33 to an apparatus for steering program selection 34 and also for travel direction preselection 35.

The steering control apparatus 30 is also connected by a signal line 36 to a steering block 37. This steering block 37 is a multi-valve arrangement by which, as a function of the signals applied via the signal line 36, hydraulic fluid fed via a hydraulic line 38 by a hydraulic pump (not shown in the drawing) is fed to the hydraulic steering motors 3, 4, 21 by hydraulic lines 39, 40, 41. However, as in FIG. 1, the steering motors 3, 4 of the load wheels are directly connected to one another so that the feeding of the hydraulic fluids with regard to the hydraulic steering motors 3 and 4 does not take place individually, but is dependent on one another, except for a small quantity of oil which compensates for possible leakages via a compensating valve in the piston.

The steering block 37 is also connected by a hydraulic line 42 to a priority valve 43. Hydraulic fluid which is not required to actuate the hydraulic steering motors 3, 4, 21 is fed to the priority valve 43 by the hydraulic line 42. From these, hydraulic fluid (to the extent required to support actuating the steering) is delivered by a hydraulic line 44 to a steering orbitrol 46, or via a hydraulic line 45 to a working control block (not shown in the drawing) in order to act on further hydraulically actuated components of the industrial truck 100.

A steering element 47 in the form of a steering wheel mechanically connected to the steering orbitrol 46 serves to actuate the orbitrol.

In the state of the steering system illustrated in FIG. 5, in which the vehicle is located in the longitudinal travel direction symbolised by the arrow P1, the steering orbitrol 46 is directly connected to the first hydraulic steering motor 3 of one of the load wheel sets 1 with the aid of a switch-over valve 48 via a hydraulic line 49. Resistances thereby generated during the driving operation are transmitted to the steering element 47 and thus are perceptible as a driving sensation. The respective steering angle of the first load wheel set 1 can be supplied by the first steering angle pickup 24 and the signal line 27 of the steering control apparatus 30. A steering angle pickup for the second load wheel set 2 is not necessary since the steering angle thereof is fixed by the hydraulic coupling to the first load wheel set. A signal line between the steering control apparatus and this wheel set is therefore also unnecessary.

In the embodiment of the industrial truck 100 shown in FIGS. 5 and 6, at least one steerable wheel is steered manually by a hydraulic connection to the steering element by a steering element 47 in the form of a steering wheel. In the longitudinal travel shown in FIG. 5, one of the load wheel sets 1 is steered manually by a hydraulic connection to the steering element 47. In this case, steering of the second load wheel set 2 takes place simultaneously because of the hydraulic coupling. In the transverse travel shown in FIG. 6, the further wheel set 20 is steered manually by a hydraulic connection to the steering element 47.

If the vehicle is now switched over by means of the apparatus 35 for travel direction preselection from the longitudinal travel illustrated in FIG. 5 to the transverse travel illustrated and symbolised by the arrow P2 in FIG. 6, the steering computer 31 then controls the steering block 37 so that first of all, via the hydraulic lines 39, 40, 41, all the wheel sets 1, 2, 20 are turned by 90°. At the same time, the switch-over valve 48 switches over to the hydraulic line 50 leading to the steering motor 21 of the further wheel set 20 so that the steering orbitrol 46 is now directly connected to the steering motor 21 of the further wheel set 20 and steering resistances of this wheel set are perceptible in the steering element 47. In contrast to the further wheel set 20, which is now steered manually, the load wheel sets 1 and 2 remain rigid.

In the longitudinal travel shown in FIG. 5, the further wheel set 20 is not steered. In this embodiment, the wheel set 20 is thus actuated exclusively in transverse travel and is then directly actuated hydraulically.

In the embodiment shown in FIGS. 5 and 6, all wheel sets can, for example, either be steered manually by a hydraulic connection to the steering element 47 or they are rigid. In the case of a switch-over of the switch-over valve 48, the previously manually steered wheel sets are brought into a specific steering position with the aid of the steering device 30 and are then rigid until the switch-over valve 48 is switched over again. The previously rigid wheel sets are manually directed.

The present invention is not limited to embodiments described herein; reference should be had to the appended claims.

LIST OF REFERENCE NUMERALS 100 industrial truck
1, 2 wheel sets
3, 4 hydraulic linear motor, synchronizing cylinder, hydraulic steering element
5 hydraulic circuit
6 traction chamber
7 pressure chamber
8 hydraulic valve
9 traction chamber
10, 11 active piston rod
12, 13 rotatably mounted device
14, 15 steering lever
16 pressure chamber
17, 18 wheel bogie
19 chassis
20 further wheel set
21 further hydraulic steering motor
22 flexible traction element
23 steering actuation wheel
24, 25 steering angle pickup
27, 28 signal lines
30 steering control apparatus
31 steering computer
32, 33 signal line
34 apparatus for steering program selection
35 apparatus for travel direction preselection
36 signal line
37 steering block
38, 39, 40, 41, 42 hydraulic lines
43 priority valve
44, 45 hydraulic line
46 steering orbitrol
47 steering element
48 switch-over valve
49, 50 hydraulic line
51, 52 segments of the chassis
53, 54 passive piston rods
55, 56 wheel
57, 58 steering bearing
59 opening
60 wheel
A, A', A" axes
P, P' point (of attack)
P1, P2 arrow
R direction of the longitudinal extent of the segments

What is claimed is:

1. A steering system for an industrial truck comprising:
a chassis;
a first wheel set configured to be hydraulically steerable;
a second wheel set configured to be hydraulically steerable;
a first hydraulic linear motor connected to the first wheel set, the first hydraulic linear motor being provided as a first synchronizing cylinder;
a second hydraulic linear motor connected to the second wheel set, the second hydraulic linear motor being provided as a second synchronizing cylinder,
wherein,
the first synchronizing cylinder and the second synchronizing cylinder are operatively connected to each other,
the first synchronizing cylinder comprises a first active piston rod configured to transmit a translational movement of a piston, and an additional piston rod configured to provide a synchronization, the additional piston rod not being connected at a free end so that the additional piston rod does not transmit a translational movement,
the second synchronizing cylinder comprises a second active piston rod configured to transmit a translational movement of a piston, and an additional piston rod configured to provide a synchronization, the additional piston rod not being connected at a free end so that the additional piston rod does not transmit a translational movement,
the first synchronizing cylinder and the second synchronizing cylinder are arranged parallel to each other,
the first active piston rod of the first synchronizing cylinder and the second active piston rod of the second synchronizing cylinder are oriented in a same direction, and
the first synchronizing cylinder and the second synchronizing cylinder are arranged stationary with respect to the chassis of the industrial truck.

2. The steering system as recited in claim 1, further comprising:
a hydraulic valve; and
a common closed hydraulic circuit,
wherein,
the first synchronizing cylinder further comprises a first traction chamber and a first pressure chamber,
the second synchronizing cylinder further comprises a second pressure chamber and a second traction chamber,
each of the first synchronizing cylinder and the second synchronizing cylinder is arranged in the common closed hydraulic circuit,
the first traction chamber of the first synchronizing cylinder is connected to the second pressure chamber of the second synchronizing cylinder, and
each of the first pressure chamber and the second traction chamber is connected to the hydraulic valve.

3. The steering system as recited in claim 2, wherein,
the first wheel set comprises a first rotatably mounted device configured to achieve a steerability,
the second wheel set comprises a second rotatably mounted device configured to achieve the steerability,
the first active piston rod of the first synchronizing cylinder is further configured to act on a first point on the first rotatably mounted device of the first wheel set,
the second active piston rod of the second synchronizing cylinder is further configured to act on a second point on the second rotatably mounted device of the second wheel set,
the first point is arranged on a first side of a first axis of rotation,
the second point is arranged on a second side of a second axis of rotation, and
the first side is different from the second side so that in spite of a synchronous movement of the first active piston rod of the first synchronizing cylinder and the second active piston rod of the second synchronizing cylinder, a rotation in an opposite direction, and thereby a steering of the first wheel set and the second wheel set, takes place.

4. The steering system as recited in claim 3, further comprising;
a first steering lever; and
a second steering lever,
wherein,
the first active piston rod of the first synchronizing cylinder is further configured to act on the first rotatably mounted device of the first wheel set via the first steering lever, and
the second active piston rod of the second synchronizing cylinder is further configured to act on the second rotatably mounted device of the second wheel set via the second steering lever.

5. The steering system as recited in claim 4, wherein,
the first steering lever is configured to be rotatably mounted on the first active piston rod and to be rotatably disposed on the first rotatably mounted device, and
the second steering lever is configured to be rotatably mounted on the second active piston rod and to be rotatably disposed on the second rotatably mounted device.

6. The steering system as recited in claim 4, wherein each of the first steering lever and the second steering lever is curved.

7. The steering system as recited in claim 4, wherein,
the first rotatably mounted device comprises a first steering lever opening,
the second rotatably mounted device comprises a second steering lever opening,
the first steering lever is configured to enter the first steering lever opening in a specific steering situation, and
the second steering lever is configured to enter the second steering lever opening in a specific steering situation.

8. The steering system as recited in claim 3, wherein no electronic coupling exists between the first rotatably mounted device and the second rotatably mounted device.

9. The steering system as recited in 1, further comprising:
a steering element;
a steering orbitrol mechanically connected to the steering element;
a steering control apparatus configured to generate a steering angle desired value;
a first steering motor provided as the first synchronizing cylinder, the first steering motor being hydraulically connected to the steering element and configured to steer the first wheel set;
a second steering motor provided as the second synchronizing cylinder, the second steering motor being hydraulically connected to the steering element and configured to steer the second wheel set;

a first steering angle pickup operatively connected to the steering control apparatus and configured to detect a steering angle of either the first wheel set or the second wheel set;

a third wheel set configured to be steered by a motor power, the third wheel set comprising a third steering motor, the third steering motor being configured to be connected or to be connectable to the steering element;

a second steering angle pickup operatively connected to the steering control apparatus and configured to detect the steering angle of the third wheel set;

a switch-over valve configured to switch between a hydraulic connection of the steering orbitrol to the first steering motor and the second steering motor, and a hydraulic connection of the steering orbitrol to the third steering motor, wherein, the first steering motor, the second steering motor, and the third steering motor of the third wheel set each being further configured to be driven selectively as a function of a desired steering angle value.

10. The steering system as recited in claim 9, wherein the steering element is a steering wheel.

11. The steering system as recited in claim 9, wherein the steering control apparatus is a computer comprising an apparatus configured to store a plurality of steering programs.

12. An industrial truck comprising the steering system as recited in claim 1.

* * * * *